United States Patent [19]
Chun et al.

[11] Patent Number: 6,023,396
[45] Date of Patent: Feb. 8, 2000

[54] MAGNETIC HEAD TIP DESIGN TO REDUCE DYNAMIC SPACING LOSS AND IMPROVE SIGNAL QUALITY IN HIGH-DENSITY HELICAL SCANNING SYSTEM

[75] Inventors: Kaynam Chun, Burlingame; Gregory A. Orton, Oakley; Larry A. Price, Fremont, all of Calif.

[73] Assignee: Ampex Corporation, Redwood City, Calif.

[21] Appl. No.: 08/996,647

[22] Filed: Dec. 23, 1997

[51] Int. Cl.[7] .................................................. G11B 5/187
[52] U.S. Cl. .......................................................... 360/122
[58] Field of Search .................................... 360/119, 120, 360/121, 122, 110

[56] References Cited

FOREIGN PATENT DOCUMENTS

| 55-34326 | 3/1980 | Japan | 360/122 |
|---|---|---|---|
| 56-153516 | 11/1981 | Japan | 360/122 |
| 59-213012 | 12/1984 | Japan | 360/122 |
| 60-101706 | 6/1985 | Japan | 360/122 |
| 62-283405 | 12/1987 | Japan | 360/122 |
| 2-249109 | 10/1990 | Japan | 360/122 |
| 3-44805 | 2/1991 | Japan | 360/122 |
| 3-119506 | 5/1991 | Japan | 360/122 |
| 4-289509 | 10/1992 | Japan | 360/122 |
| 5-234014 | 9/1993 | Japan | 360/122 |

*Primary Examiner*—William J. Klimowicz
*Attorney, Agent, or Firm*—John G. Mesaros; George B. Almeida

[57] ABSTRACT

Improved magnetic tip designs attain low spacing loss and enhance the channel output signal while extending head life. One embodiment includes a relatively flat tape contacting surface whose outer edges are modified to provide a tape contacting surface of dumbbell or bow-tie shape, that is, a shape which is narrower at its center near the magnetic gap and wider at its front and rear ends. The desired shape for the tape contacting surface is attained by shaving or beveling the edges of the tip at a relatively sharp angle to remove more material along the top of the curvature of the head near the gap than at the front and rear of the tape contacting surface. This allows air to bleed from under the tape as the head tip travels past the tape. In another embodiment the desired shape is attained by polishing and/or grinding the edges of the tip at a controlled angle as small as 1.0 degree to remove sufficient material to create the desired bow-tie shaped tape contacting surface. Either embodiment may be further modified to define an air knife surface at the leading edge of the tip which reduces the effect of an air shock wave impacting the front of the tip as it initially reaches an operative relationship or "read" position with respect to the tape.

10 Claims, 2 Drawing Sheets

MAGNETIC HEAD TIP DESIGN TO REDUCE DYNAMIC SPACING LOSS AND IMPROVE SIGNAL QUALITY IN HIGH-DENSITY HELICAL SCANNING SYSTEM

BACKGROUND OF THE INVENTION

1. Field of the Invention

The present invention relates to a high density magnetic recording system having magnetic heads adapted to provide a high data transfer rate (higher than 15 Mbyte/sec) with a high linear speed (>27.9 m/sec=>1100 inches per second) and high recording density with low spacing loss and excellent signal quality from the start to the end of a scan. Such a system might involve either longitudinal or helical tape recording that uses a ring head.

2. Description of the Prior Art

As data transfer rate and recording density increase in magnetic recording, head spacing loss becomes more critical. Magnetic head spacing loss is dependent upon many variables, including radius of curvature of the head and is also dependent upon how the tape contacts the head while the scanner rotates. When scanner speed increases, head-to-tape spacing also generally increases since air film thickness between the head and tape increases. In the usual helical scanner there are two record heads and two playback heads. Each head has two tips. Therefore, eight rotating tips individually contact (or come into magnetic relationship with) the tape. Ideally, each tip should maintain a minimum spacing with respect to the tape while the scanner rotates. If there is significant spacing variation while the scanner rotates, this will result in variation in the signal output from each channel.

Various head configurations have been used in the prior art in connection with high density helical and/or longitudinal recording on tape. The style most applicable to the present system would generally fall within a class of ring heads that includes a pair of generally opposed core pieces oriented upon on either side of a gap structure with a winding window opening below the gap structure. The opposed core pieces are bonded together to form the magnetic head structure. The tape contact surface of the head is configured in a curved shape of relatively large radius in the direction parallel to the direction of tape travel. The width of the head is usually uniform from the leading edge to trailing edge, and tape contact surface profile in the direction perpendicular to the direction of tape travel is generally of flat or mildly arcuate outline.

A variety of mechanisms have been used to minimize air pressure with respect to such heads, including the formation of slots in the head surface, parallel or perpendicular to the direction of tape travel. It has also been generally recognized that head wear, head contour, lifetime, tip projection, and performance factors such as tape head separation are all inter-related. Generally, heads that wear faster have less spacing between head and tape.

Previous investigators have observed that air film thickness at the leading edge of the head is generally greater than that at the trailing edge. Large air film thickness at the leading or trailing edge of the head may result in non-uniform signal output, either at the beginning or end of scanning. It is also well known that head-to-tape spacing generally increases with linear speed and decreases with tension.

One of the problems with high linear speed operation (>27.9 m/sec) is to overcome spacing loss and to prevent bow-wave impact due to head-to-tape interaction with compressed air films at high speed and high tension It has been a big challenge to overcome high spacing loss and/or a high degree of head-to-tape interaction at high data transfer rate (>15 Mbyte/sec). Even with extensive efforts to analyze tape flow, there are still many unknown aspects of the dynamics of head and tape in high speed helical recording.

SUMMARY

The present invention concerns an improved head design, or head designs that tend to produce more uniform, lower dynamic spacing between head and tape from the start to end of a scan plus, improved head wear.

A first embodiment includes a magnetic head having a large radius of curvature in the direction of tape movement and a relatively narrow tape contacting surface near the magnetic gap. The outer edges of the tape contacting surface are modified to more readily allow air to escape along a direction transverse to tape movement in order to minimize air film thickness and also maintain its uniformity from the far end of the leading edge of the head and to the far end of the trailing edge. As a result of these edge modifications, the top surface of the tape contacting area of the head assumes a dumbbell or bow-tie shape, being more narrow at its center near the magnetic gap. In the first embodiment, the edge outline is attained by shaving or beveling the edges of the tip at a sharp angel, for example a 45 degree angle from front to back. The shaving removes more material along the top of the curved surface than at the front and rear, so as to form a desired shape for the tape contacting surface that will properly influence the volume, or thickness, of the air film between the tape and head contacting surface.

In a second embodiment, the desired shape is attained by polishing and/or grinding the edges of the tip surface at a smaller angle of declination to remove the material necessary to create the bow-tie shape, which allows air to bleed or dissipate from the air film as the head travels past the tape.

Either embodiment may be further modified by formation of another 90 degree cut at the front of the head tip to provide an "air knife" surface that acts to reduce head-tape interaction to an air shock wave that, otherwise, would impact the front of the head tip as it initially reaches a position in operative relationship or "read" position with respect to the tape. In all instances, the structures described result in an improvement in the head spacing loss and signal detection that otherwise would be experienced.

DETAILED DESCRIPTION OF THE PREFERRED EMBODIMENTS

Figure 1A:
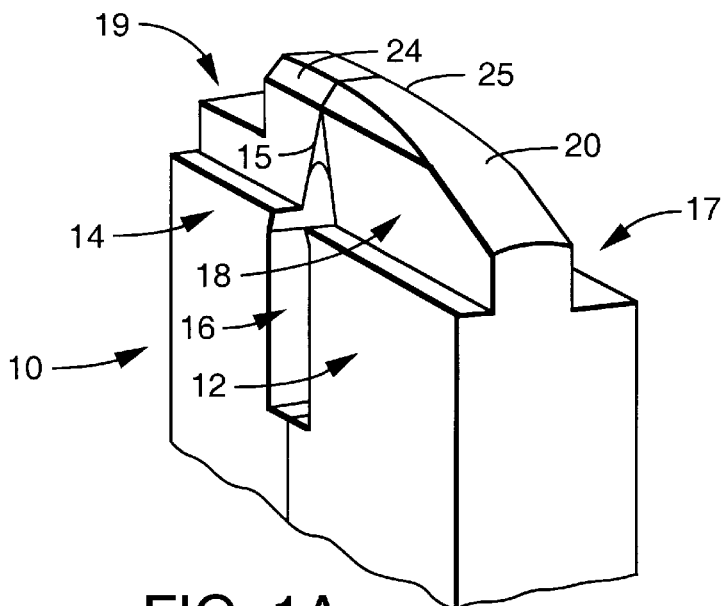
FIG. 1(a) is a diagrammatic, perspective view of a first head embodiment of the present invention.
Figure 1B:
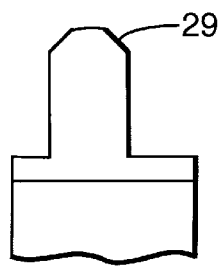
FIG. 1(b) is a vertical cross-sectional view taken through the center region of FIG. 1(a)
Figure 1C:
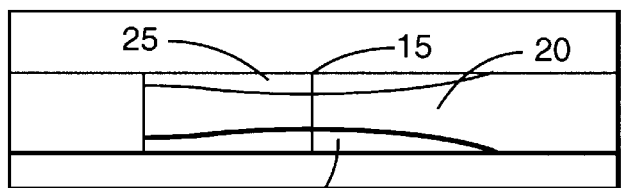
FIG. 1(c) is a planar view of the tape contact surface showing a dumbbell- shaped surface formed as the tape contact surface of the first embodiment.

Referring now to the drawings, and particularly to FIG. 1, an embodiment of the present invention is illustrated including a magnetic head tip 10 which can be for a ring head (ferrite, thin film head, laminated head, or MR head) adapted to be used in high density tape recording of longitudinal or helical configuration. The present invention will be described hereinafter as if it were designed to be utilized in a helical tape recording application using a rotating scanner with two record heads and two read heads, each having two tips, to constitute a total of eight rotating tips that will, in turn, individually come into magnetic relationship with the tape.

Tip 10 includes a front magnetic member 12 and a rear magnetic member 14 supported by means not illustrated on either side of a gap structure 15. A winding window 16 is defined between the front and rear members, and each side of the upper portion of the tip is partially removed, as indicated by arrows 17, 18, to define a narrow, tape contacting region 20 having a generally curved outline of large radius along the outline of tapes travel. Also, as indicated by arrow 19, a portion at the rear of the tip is removed. All of this design is generally known in the prior art as practiced in high density magnetic recording.

In this embodiment, head tip 10 has been improved by carefully controlling tape contacting region 20 by the removal of edge portions of the narrow, tape contacting region 20 by beveling, or shaving, those edge portions at a sharp angle, for example a 45 degree angle as illustrated in FIG. 1. The beveling produces declined surfaces 24, 25, formed on either side of surface 20 resulting in a shape for surface 20 that is narrow at the top or center of the tape contacting region, and grows wider in each direction towards the front and rear of the tape contact region.

FIG. 1(b) illustrates the cross-section 29 of the head tip that results at the center or top of the tip, including a very narrow portion at the gap structure. In the preferred embodiment the overall dimensions of the head tip were 85 mils in length and 2.5 to 3.5 mils in width with a longitudinal axis radius of curvature of 500 mils, and a transverse axis radius of curvature of 70 mils. The tape contact surface is 2.5 mils in width and about 35 mils in length.

It has been found that by providing such a shape the air film that is retained between the head and tape surfaces will be gradually dissipated along the edges or sides of the head tip as it passes the tape during a normal read or record cycle. As a consequence, the head is attracted into a closer, yet well-cushioned, relationship with the tape that results in lower head wear than was previously possible with this type of recording head.

Figure 2A:
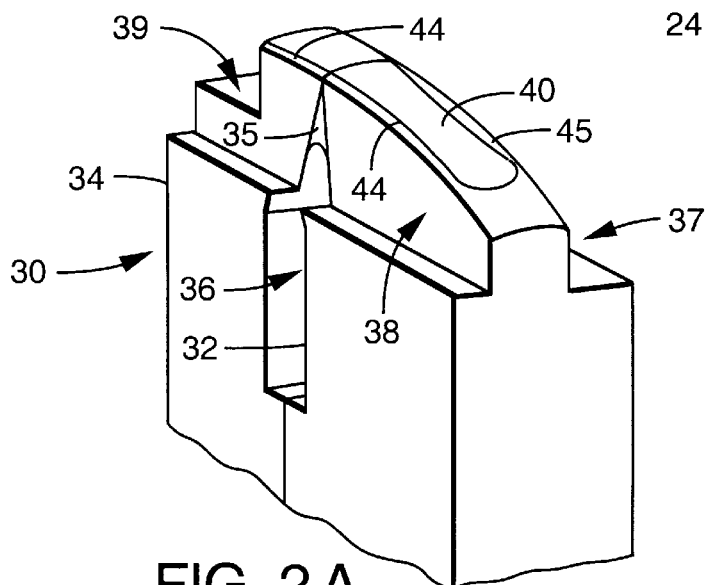
FIG. 2(a) is a diagrammatic, perspective view of a second head embodiment of the present invention.
Figure 2B:
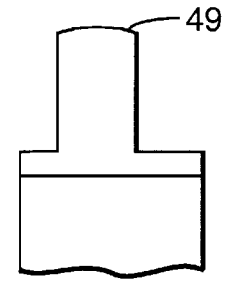
FIG. 2(b) is a vertical cross-sectional view taken through the center region of FIG. 2(a)
Figure 2C:
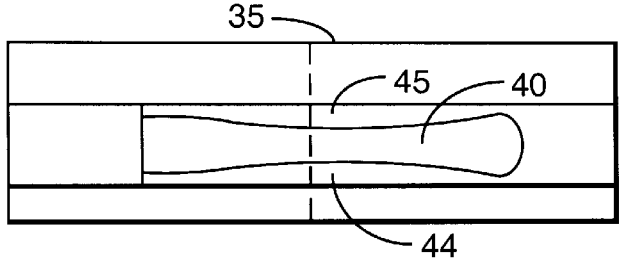
FIG. 2(c) is a planar view of the tape contact surface showing a bow-tie shaped surface formed as the tape contact surface of the second embodiment.

Referring now to FIG. 2, another embodiment of the invention is illustrated including similar elements to those shown in FIG. 1. Thus, a tip 30 includes a front magnetic member 32 and a rear magnetic member 34 supported by means not illustrated on either side of a gap structure 35. A winding window 36 is defined between the front and rear members, and each side of the upper portion of the tip is partially removed, as indicated by arrows 37, 38 to define a narrow, tape contacting region 40, again having a generally curved outline of large radius along the outline of tape travel. Again, as indicated by arrow 39, a portion of the rear of the head tip is removed.

The embodiment of FIG. 2 is similar to the design of FIG. 1 in that the tape contacting surface is slightly curved in a direction transverse to the direction of tape travel. In addition, instead of beveling the edges of the tape contracting surface at a relatively sharp angle, the edges are generally rounded, to have a less pronounced downward declination, or offset, of slightly more than 1.0 degree, with respect to the moderately curved surface of the tape contacting region. This again forms declined surfaces 44, 45 on either side of surface 40 which serve to perform the same function toward maintenance of the air cushion between the tape and head as do surfaces 24, 25 in FIG. 1(a). FIG. 2(b) illustrates the cross-section 49 of the head tip that results at the top of the tip, near the gap structure.

The embodiment of FIG. 2 has at least two components of radius of curvature (one for surface 40 and the other for declined surfaces 44, 45 ) that satisfy the following condition;

$$R_{44,\,45} < R_{total} < R_{40}$$

Thus, in the second embodiment, the radius of curvature of surface 40 is larger than the combined radius of curvature of declined surfaces 44, 45. We found that if the ratio of $R_{40}$ to $R_{44,\,45}$ is about 4-1; the heads maintained good signal performance from the start to the end of the scan.

The width of surface 40 near magnetic gap is ideally;

$$0.7\ TW < \text{width of surface } 40 < 1.5\ TW$$

where TW is the recorded track width. The best signal performance was achieved when the width of surface 40, near the magnetic gap, was about the same as the recording track width.

Figure 3:
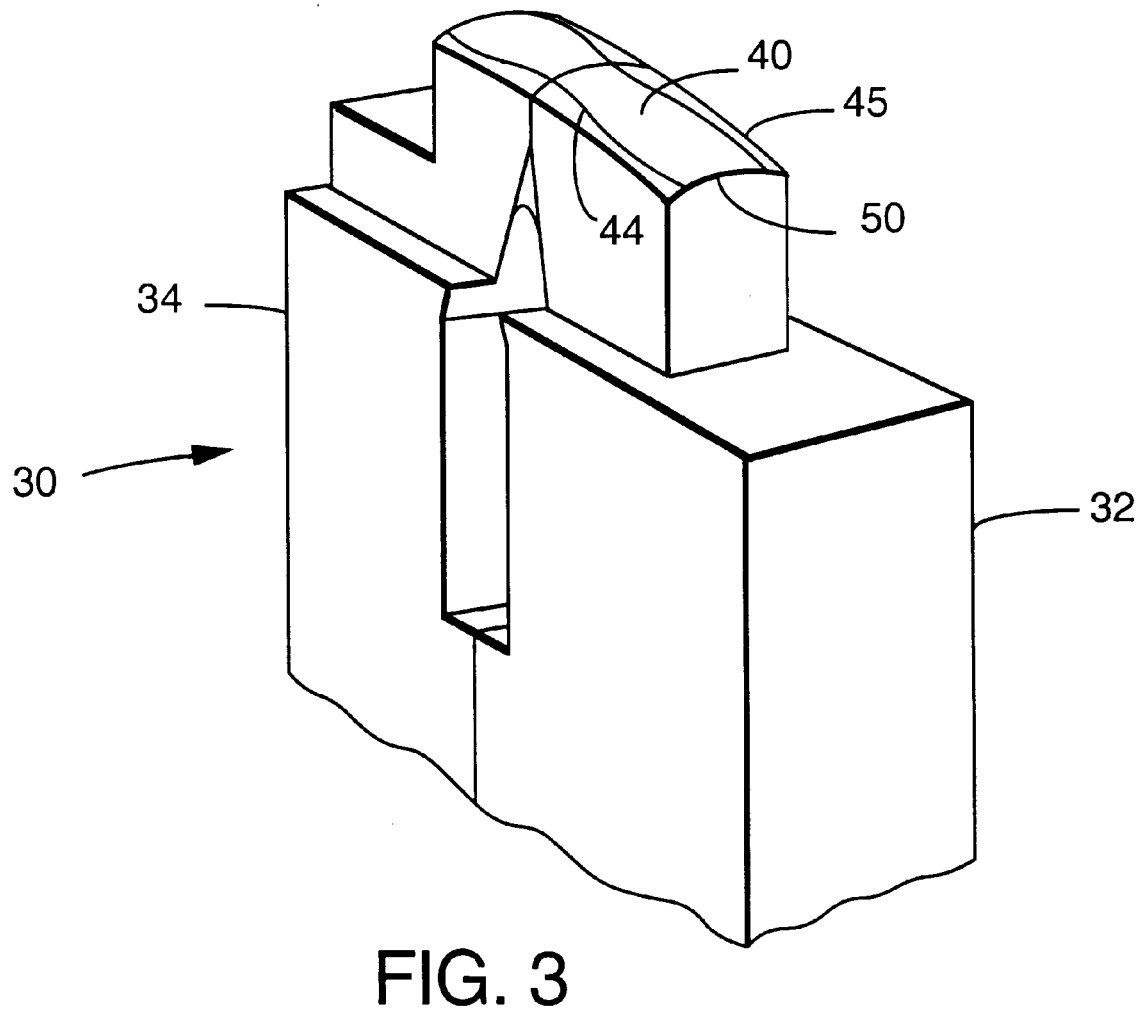
FIG. 3 is a diagrammatic, perspective view of a front portion of a modified version of the second embodiment of the invention.

Referring now to FIG. 3, another embodiment is illustrated which is quite similar to that illustrated in FIG. 2 and wherein like numerals are used to identify like elements. The embodiment of FIG. 3 varies in that it has been further modified at the front portion of the head tip by removal of another portion of the structure by making a 90 degree cut at the front of the head tip just inside the periphery of the tape contacting area of the tip that extends to the bottom of the other relieved portions surrounding the tip. This modification leaves an air knife surface 50 at the front of the head tip that has been found to contact and break up the initial portion of the air shock wave that initially comes into contact with the head tip as it passes into operative relationship with the tape. Reduction of any substantial impact from the air shock wave enhances the performance of the head and permits improved control of the air cushion between the head and media, with resulting, additional improvement in signal detection and spacing loss.

Although specific dimensions were given for the preferred embodiment, in order to fulfill the requirements for a complete disclosure of the invention, it should be recognized that the concept underlying the invention may be embodied in other structural forms, including different dimensions, depending upon the recording density, head spacing and other aspects of the recording system under consideration.

What is claimed is:

1. A magnetic head tip having a magnetic gap for high-density recording comprising:

a recording media interface surface formed upon said tip having a large radius of curvature in the direction of media travel, and having a relatively flat outline transverse to the direction of media travel with a width that is larger than the recording track pitch of the media;

the outer edges of the tip having side surfaces formed thereon along the direction of media travel, that are angularly depressed with respect to the relatively flat outline of the media interface surface of the tip, with the side surfaces that are removed being narrower at the front and rear of the media interface surface of the tip than at the center of the media interface surface so as to form a bow-tie shaped outline for the media interface surface, with the narrowest width of the media interface surface being generally centered near the magnetic gap of the head tip;

wherein the narrower interface surface proximate the magnetic gap allows air to more readily escape along a direction transverse to the direction of media travel.

2. The magnetic head tip of claim 1 wherein the width of the media interface surface in the region of the magnetic gap of the head tip is less than 1.5 times the track pitch of the interrelated media surface.

3. The magnetic head tip of claim 1 wherein the angularly depressed surfaces of the head tip are formed at an angular departure from the flat surface of about 1.0 degree.

4. The magnetic head tip of claim 3 wherein the angular departure exceeds said about 1.0 degree.

5. The magnetic head tip of claim 4 wherein the angular departure is about 45 degrees.

6. The magnetic head tip of claim 1 having a small cut portion formed generally perpendicularly through the front of the media interface surface of the head tip to define an air knife surface for reducing head tip to media interaction to an air shock wave, said air knife surface being the portion of the head tip to first come into interrelationship with the media.

7. The magnetic head tip of claim 1 wherein the tip surface profile near the magnetic gap includes two sections of different angular declination having a ratio of about 2–5 therebetween.

8. A magnetic head configured for providing high data transfer rate in a high density magnetic media recording/readout system, the head including front and rear magnetic members selectively bonded together and including a winding window and a magnetic gap, wherein an upper portion of the head is partially removed to define a narrowed tip, comprising:

a media contacting surface formed on the tip and having a large radius of curvature in the direction of media travel, and having a width that is larger than a recording track pitch of the media;

said tip having outer side portions along the length parallel to the direction of media travel, which side portions are selectively angularly depressed with respect to the media contacting surface such that the width of the media contacting surface in the region of the magnetic gap is narrower than the width thereof at the font and rear of the media contacting surface to define a bow-tie shaped surface for contacting the media; and wherein the narrower gap region of the bow-tie shaped surface readily allows air to escape along a direction transverse to the direction of media travel to dissipate any air film to enhance head-to-media spacing and thus the high data transfer rate.

9. The magnetic head of claim 8 wherein the width of the magnetic gap is defined by the narrowest width of the media contacting surface at the gap region of the bow-tie shaped surface.

10. The magnetic head of claim 8 wherein a front portion of the tip is removed to define an air knife surface extending generally perpendicular from the front of the bow-tie shaped surface such that the air knife surface provides the initial contact of the tip with the media while reducing head to media interaction to an air shock wave.

* * * * *